United States Patent
De Rose

[15] 3,650,217
[45] Mar. 21, 1972

[54] SHEET HANDLING APPARATUS
[72] Inventor: Kenneth N. De Rose, Toledo, Ohio
[73] Assignee: Libbey-Owens-Ford Glass Company, Toledo, Ohio
[22] Filed: Jan. 19, 1970
[21] Appl. No.: 3,650

Related U.S. Application Data

[60] Division of Ser. No. 664,440, Aug. 30, 1967, Pat. No. 3,495,724, which is a continuation-in-part of Ser. No. 568,514, July 29, 1966, abandoned.

[52] U.S. Cl. ..............................104/172 S, 198/41, 294/103
[51] Int. Cl. .........................................................B65g 17/46
[58] Field of Search..................104/128, 130, 129, 96, 172 S; 198/177, 203, 41; 214/1 S, 1 R

[56] References Cited

UNITED STATES PATENTS

| 2,048,937 | 7/1936 | Larson | 104/128 X |
| 2,476,497 | 7/1949 | Landahl | 198/203 |
| 2,710,493 | 6/1955 | Glynn | 214/1 S X |

FOREIGN PATENTS OR APPLICATIONS

| 1,152,958 | 8/1963 | Germany | 198/41 |

*Primary Examiner*—Gerald M. Forlenza
*Assistant Examiner*—Frank E. Werner
*Attorney*—Collins and Oberlin

[57] ABSTRACT

Conveyor means for moving sheet material along a conveyor system comprised of aligned units. The conveying means includes a carrier having connector means and each of the conveyor units is provided with endless driving belts. The connector members are arranged at the opposite ends of the carrier and are adapted to engage the endless driving belts by magnetic attraction.

4 Claims, 17 Drawing Figures

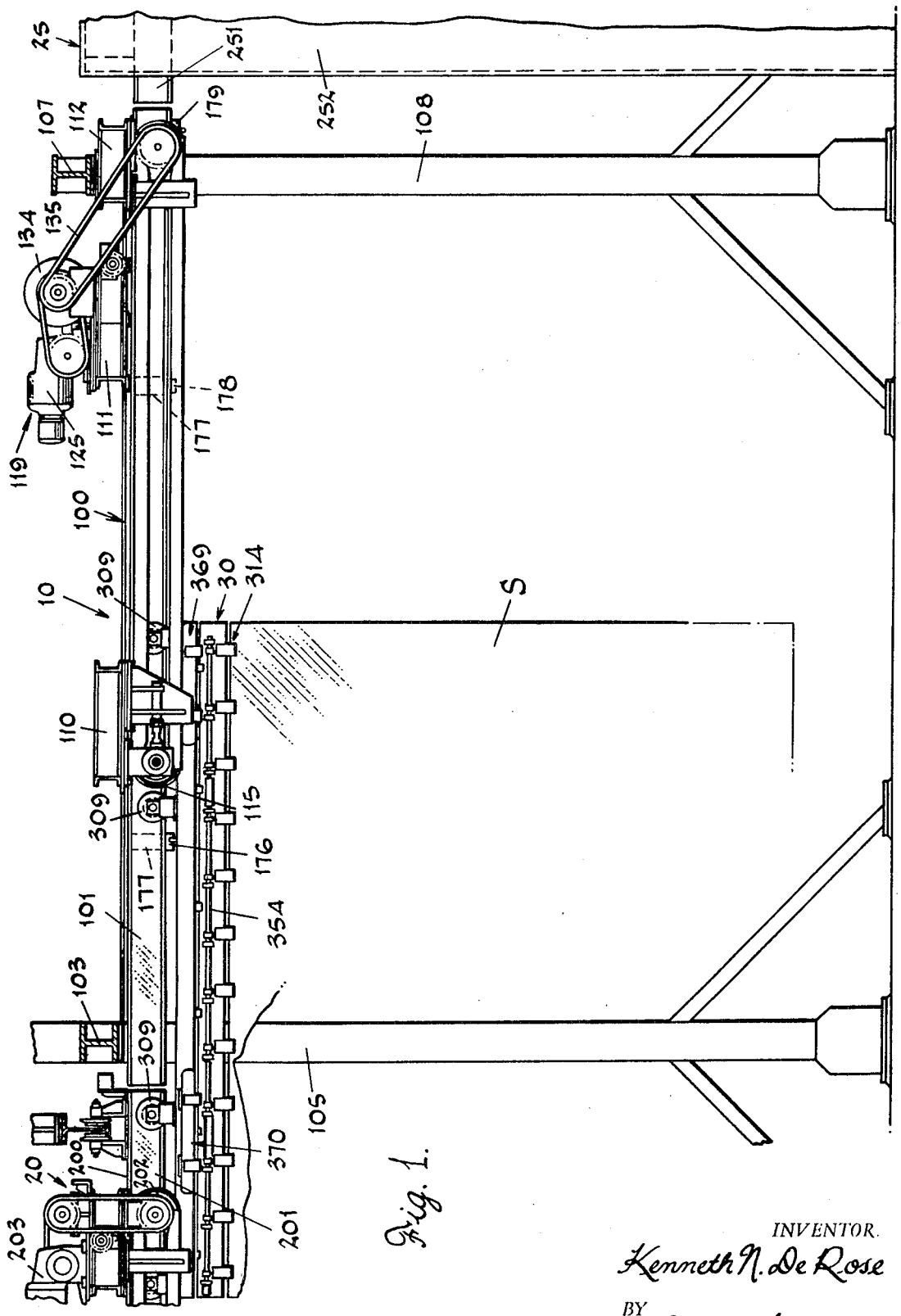

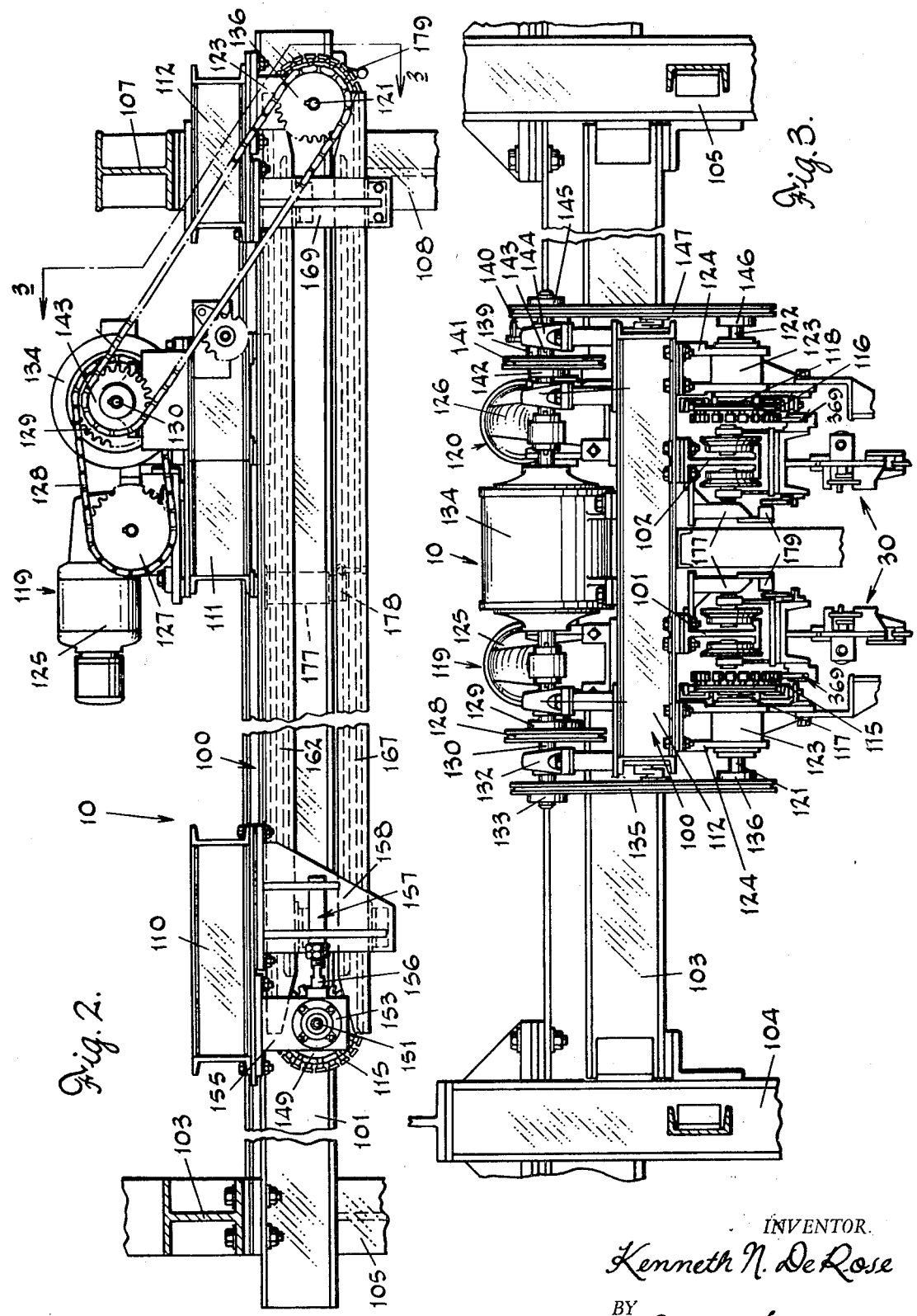

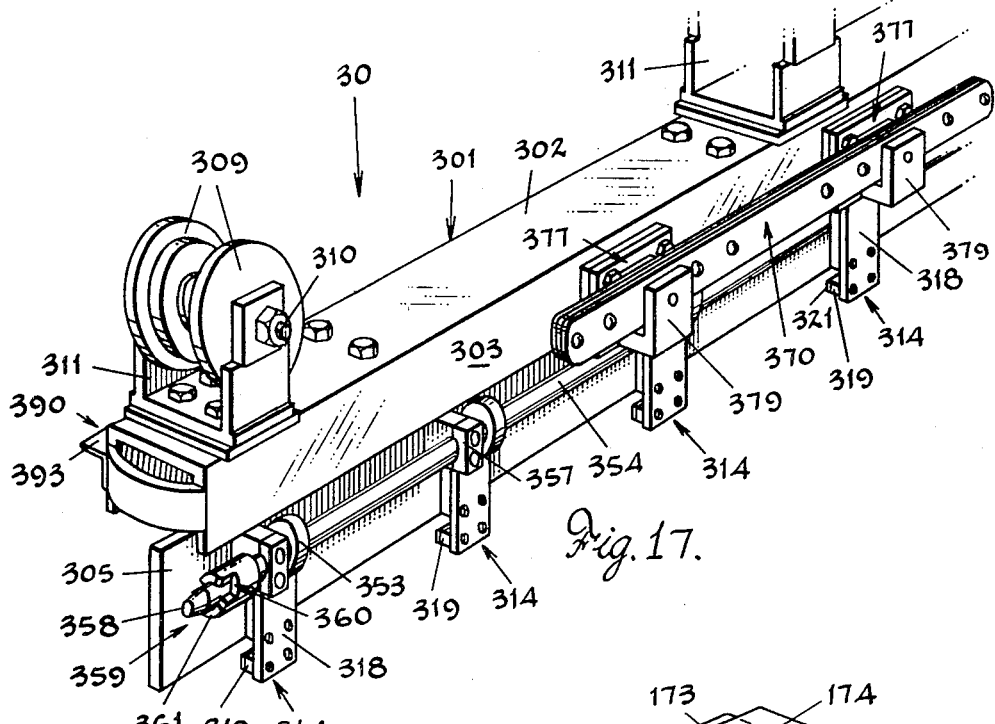
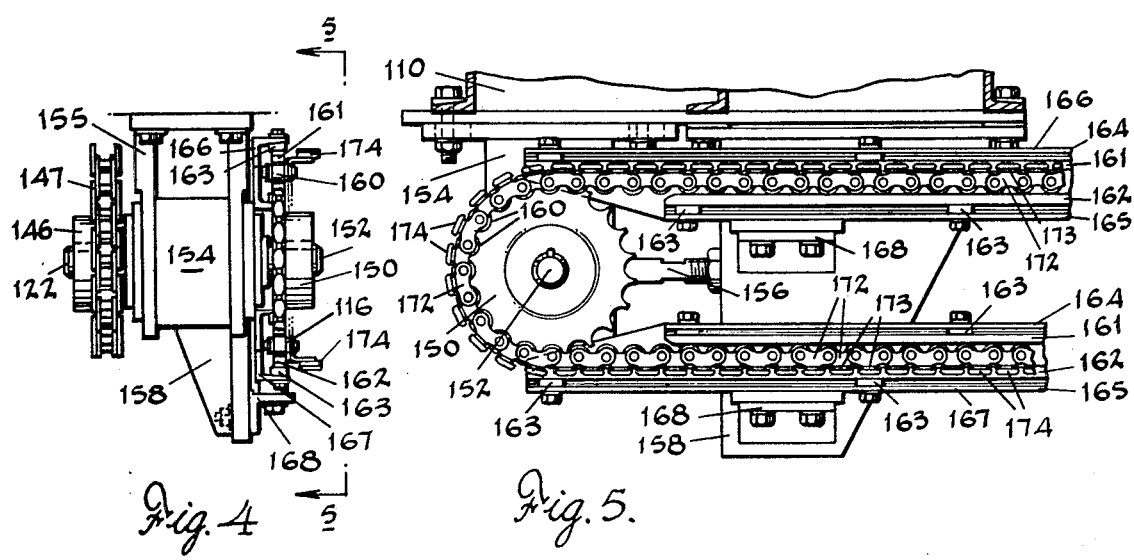

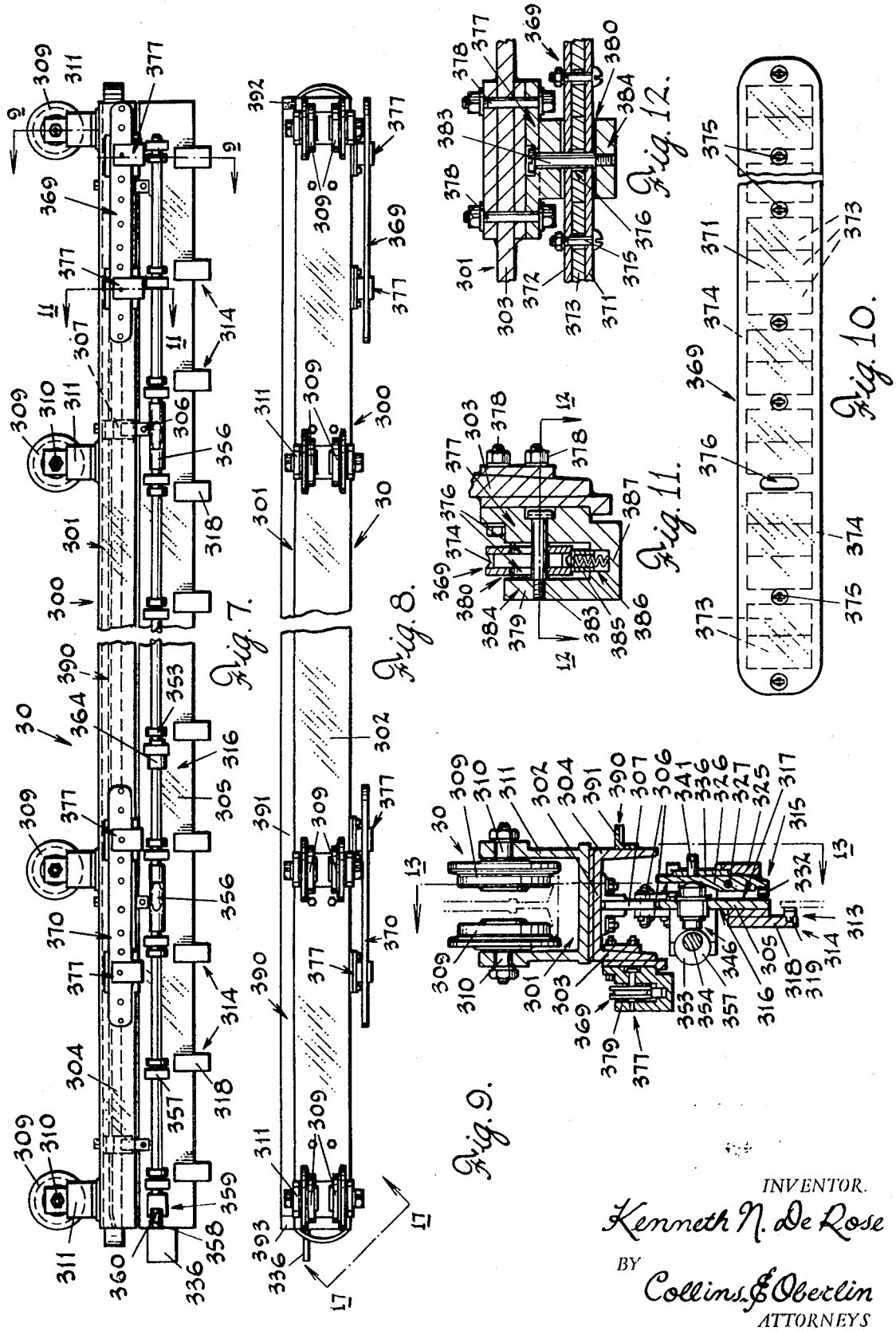

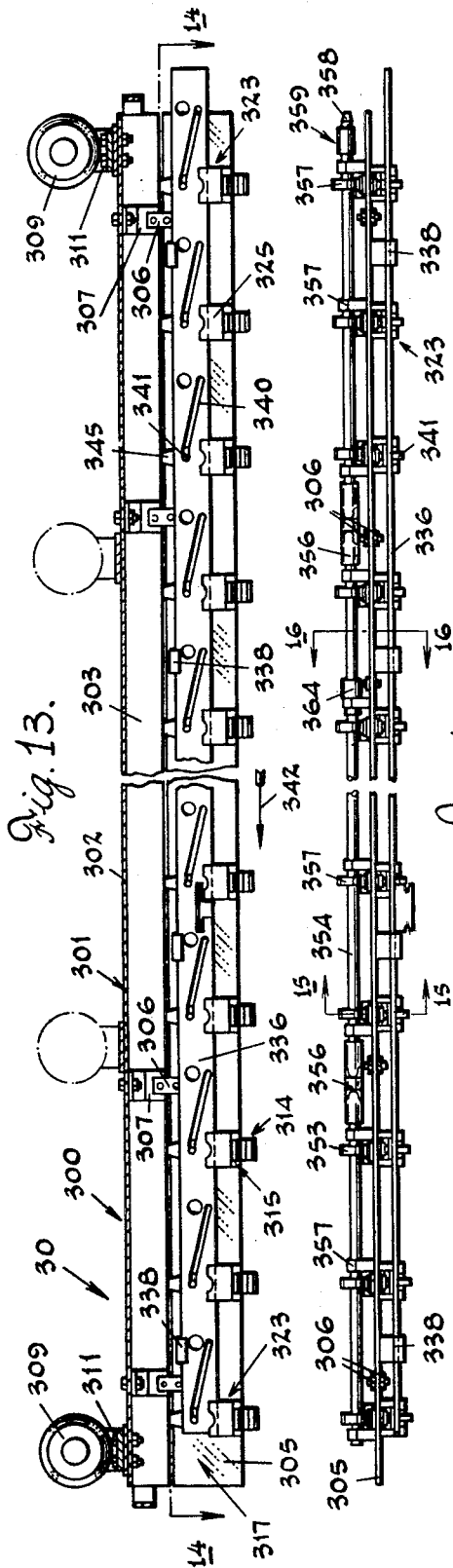
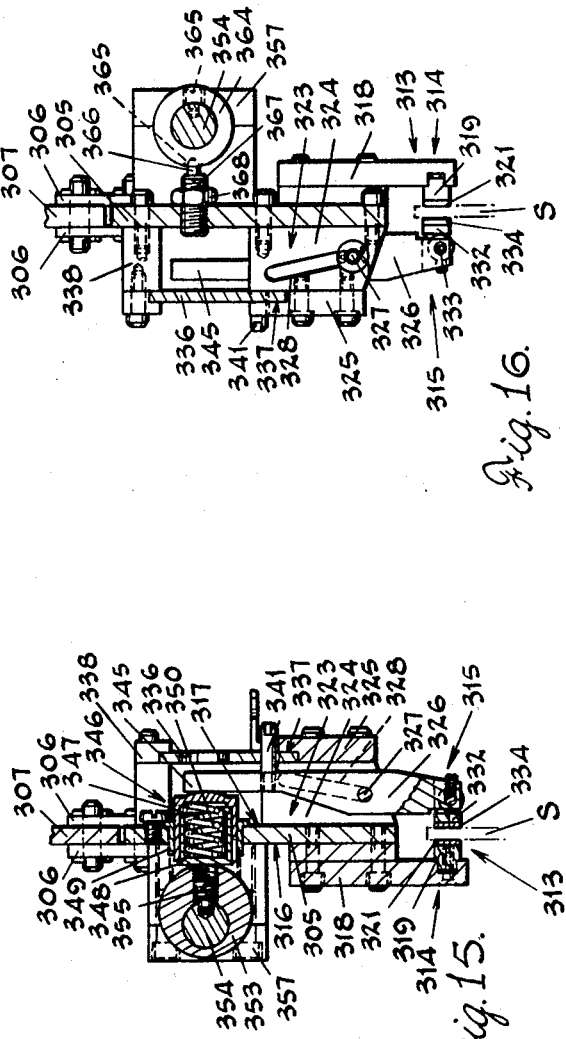

3,650,217

1

SHEET HANDLING APPARATUS

This application is a division of application Ser. No. 664,440, filed Aug. 30, 1967, now U.S. Pat. No. 3,495,724, which in turn is a continuation-in-part of application Ser. No. 568,514, filed July 29, 1966 and now abandoned.

The present invention is concerned with a new and improved conveyor system which is adapted for the continuous, rapid and effective handling of sheet materials. The conveyor system of this invention comprises:

a. a carried for gripping a sheet along the upper edge thereof and supporting the sheet in a vertical plane;
b. a number of individually-powered, aligned conveyor sections or motorized units for producing movement of the carrier;
c. each motorized unit having at least one endless chain belt provided with outwardly directed engageable lugs; and
d. each carrier having bars adjacent its opposite ends that are adapted for sequential magnetic engagement with the chain belts thereby to remain engaged with a chain belt by one bar to move the carrier forwardly until a second bar becomes magnetically engaged with the chain belt of a succeeding motorized conveyor unit.

It is therefore a main object of this invention to provide an improved carrier for sheet materials and a conveyor system for advancing the carrier along a path of movement.

Another object of the invention is to provide a carrier with novel means for supporting a sheet of material along its upper edge by clamping members adapted for rapid engagement and disengagement with said sheet edge.

Another object of the invention is to provide in a conveyor system of the above character a series of individually-powered, aligned motorized units each having driven means adapted to advance a carrier along a path while engaged therewith.

Other objects and advantages of the invention will become more apparent during the course of the following description when read in connection with the accompanying drawings.

In the drawings wherein like numerals are employed to designate like parts throughout same:

FIG. 1 is a side elevation view of a portion of a conveyor system, as constructed in accordance with the invention, with a sheet supporting carrier adapted to be moved thereon;

FIG. 2 is an enlarged side elevation view of a conveyor motorized unit;

FIG. 3 is an end view of the conveyor unit looking from the line 3—3 of FIG. 2;

FIG. 4 is an end elevation view of one side of the conveyor unit;

FIG. 5 is a side elevation view as taken in the direction of arrows 5—5 of FIG. 4;

FIG. 6 is a perspective view of an improved form of chain belt link employed in the conveyor system;

FIG. 7 is a broken side elevation view of a sheet-supporting carrier;

FIG. 8 is a broken plan view of the carrier;

FIG. 9 is an enlarged, transverse vertical sectional view taken on the plane of line 9—9 of FIG. 7;

FIG. 10 is a side elevation view of a connector bar for connecting the carrier to the conveyor system;

FIG. 11 is an enlarged, transverse vertical sectional view taken on the plane of line 11—11 of FIG. 7;

FIG. 12 is a horizontal sectional view taken on the plane of line 12—12 of FIG. 11;

FIG. 13 is a broken elevation view of the opposite side of the carrier as taken on the plane of line 13—13 of FIG. 9;

FIG. 14 is a horizontal section view as taken on the plane of line 14—14 of FIG. 13;

FIG. 15 is a transverse, vertical section view as taken on the plane of line 15—15 of FIG. 14;

FIG. 16 is a transverse, vertical section view as taken on the plane of line 16—16 of FIG. 14; and FIG. 17 is a fragmentary perspective view of one end of a support carrier as taken in the direction of arrows 17—17 FIG. 8.

DETAILED DESCRIPTION OF THE INVENTION

With reference to FIG. 1 of the drawings, there is shown a conveyor drive unit, designated in its entirety by the numeral 10, a conveyor drive unit 20 and a like drive unit 25, all being arranged in horizontally aligned, end-to-end relation to one another. Thus, while each conveyor drive unit constitutes an individual structural entity, in the same manner, they together comprise the functional components of a novel conveyor system on which a series of sheet-supporting carriers 30 can be handled to progressively advance sheets S of such materials as glass through sequentially occuring operations.

Generally described, each conveyor driven unit, of which the unit 10 can be considered typical, is adapted to receive and then during advancing movement, discharge a carrier. During normally contemplated sequences of operation, a carrier is received on a conveyor drive unit and causes the power source thereof to halt further movement. Thus, as a preceding carrier is advanced from one conveyor unit, the following carriers in turn will be advanced from one unit to the next. An important aspect of this invention is concerned with the means by which the carriers are moved by and between the drive units of the conveyor system. This resides in the provision of magnetically constructed connector bars located adjacent the ends of each carrier and adapted to attract moving elements, such as endless chain belts, driven by the power sources of each conveyor drive unit.

As shown in FIG. 1, one connector bar of the carrier 30 has engaged with the chain belt drive of the conveyor unit 10 while the other or second connector bar is still attracted to engage with the chain belt drive of the conveyor unit 20. Stated otherwise, during the interim of separation of the first connector bar from the chain belt of unit 20, the second connector bar will be effective to carry out advancing movement of the carrier. And, when the second connector bar becomes disengaged, there will exist an interim during which the first connector bar will continue such advancing carrier movement while engaged with the chain belt of the next conveyor drive unit, such as the unit 10. On a practical basis to serve this purpose, the distance between chain belts of the aligned conveyor units is shorter than the spaced distance between the connector bars on each carrier.

As shown in FIGS. 7 through 17, the structure of each supporting carrier 30 includes means for supporting a sheet S by elements that are adapted to grip the upper edge of the sheet, such elements in the form of a fixed member and a movable component being made operable in a substantially automatic manner to engage with and then disengage from the sheet.

THE CONVEYOR DRIVE UNIT

As illustrated in FIGS. 1, 2, 3, 4 and 5, the conveyor drive unit 10 includes a stationary structure of which the framework 100 includes rails 101 and 102 that are suspended at their west ends from the beam 103, between vertically disposed columns 104 and 105. As seen in FIG. 1, the rails 101 and 102 are carried at their opposite ends by a beam 107 mounted at its ends by vertically disposed columns, such as the column 108. The rails 101 and 102 support a series of platforms 110, 111 and 112 on which are mounted the driving and supporting elements for the conveyor chain belts 115 and 116. The chain belts 115 and 116 are similarly driven by sprockets 117 and 118 from sources of power indicated generally at 119 and 120; the shafts 121 and 122, respectively, of said sprockets being journaled in bearing brackets 123 secured by plate brackets 124 to the platform 112.

The power sources 119 and 120 are generally mounted on the platform 111 and include gear-motors 125 and 126, respectively. In one instance, the output shaft of gear-motor 125 mounts a sprocket 127 which through chain belt 128 drives a sprocket 129 on shaft 130. This shaft, journaled in bearings 132, at one end mounts a sprocket 133 and at the other end is joined to the driver component of a "tie" or coupler clutch device 134. The sprocket 133 by chain belt 135 drives sprocket 136 on the outer end of shaft 121 to drive related sprocket 117 and thereby operate the associated conveyor chain belt 115.

With regard to power source 120, the output shaft of gear-motor 126 drives a sprocket 139 (FIG. 3) by means of a magnetic clutch 140, with the sprocket 139 by chain belt 141 operating a sprocket 142 on a shaft 143. The shaft 143, journaled in bearings 144, is equipped at one end with a sprocket 145 while the opposite end is joined to the driven component of the coupler device 134. Sprocket 145 is coupled to a sprocket 146 by chain belt 147; the sprocket 146 being mounted on shaft 122 opposite to the sprocket 118, about which conveyor chain belt 116 is entrained.

Each conveyor chain belt 115 and 116 is similarly entrained at its oppositely looped end about an idler sprocket 149–150 (FIGS. 2, 4 and 5) that are mounted on shafts 151–152 supported by bearing brackets 153–154 similarly supported by end plates 155 on the platform 110.

The spaced distance between each of the pair of shafts 121–151 or 122–152 is controlled, to maintain the required tautness in the roller chain belts 115 and 116, by means of similar adjusting devices 156 (FIG. 2) mounted by a fixed case 157 on a plate bracket 158 suspended from the platform 110.

Between the shafts 121–151 and 122–152, the rollers 160 of the chain belts 115 and 116, in the upper and lower flights thereof, are supported between rails 161 and 162 mounted by blocks 163 on the opposed legs 164 and 165 of channel members 166 and 167. The ends of these channel members, adjacent the bearing brackets 123, 153 and 154, are secured by brackets 168 to the similar plate brackets 158 and 169 suspended from platforms 112 and 110, respectively.

As shown in FIG. 6, the links 172 of each chain 115, 116 are formed with an outwardly directed lug 173 on which is fixed a magnetically attractable plate 174. As will hereinafter be explained the plates 174 constitute the physical connections between the drive chain belts and the sheet-supporting carriers. Since it is preferable to halt one support carrier at a predetermined position in transverse relation to an adjacent carrier when two carriers are moved along a conveyor system as herein shown, it is believed to be readily apparent that each of the chain belts 115 or 116 will be driven individually to thereby move the associated carrier forwardly or rearwardly between the ends of the framework 100 until the carrier reaches a "centered" location and, through certain controls, causes the related motor 125 or 126 to be halted. In this connection, it should be mentioned that in a contemplated alternative structure the plate 174 can, if desired, be made of a permanently magnetized metal and insulatingly supported, in one way or another, on the associated link-lug 173.

The rails 101 and 102, adjacent their entry ends, carry similarly located, transversely-aligned switch devices LS 176 secured by mounting brackets 177 (FIGS. 2 and 3). Likewise, adjacent their opposite or exit ends, the rails are provided with transversely aligned switch devices LS 178 and, at their east ends, carry switches LS 179 on brackets 177. LS 178, in each instance, when actuated by a control element on each of the sheet-support carriers 30, as will later be described, causes halting of the associated belt motor 125 and 126. LS 176 controls the centered positioning of a carrier 30, as on the rail 101 of the conveyor unit 10, by producing forward jogging movement of the carrier while the oppositely disposed LS 179 will effect reverse movement of the carrier in the event that it has overrun the desired position. LS 178, on the other hand, is adapted to directly effect halting of the related gear-motor when the carrier is centered. This is also true in connection with similarly employed LS 176, LS 178 and LS 179 that are adapted to be activated by the presence of a carrier 30 on the rail 102 of the conveyor drive unit.

As earlier indicated, the conveyor 10 is located in aligned relation to the adjoining conveyor unit 20, from which a sheet-supporting carrier 30 is received, and the conveyor unit 25 onto which the carrier or carriers will be advanced in subsequent stepwise sequences of operation, see FIG. 1. Generally stated, the conveyor unit 20 has a fixed framework 200 including rails 201 on which the carriers are supported and advanced by chain belts 202 that are driven by motors such as the motor 203. Similarly, the conveyor unit 25 includes a framework 251 which, as shown, is contained within a chambered housing 252 into which the supported sheets are to be conveyed for one purpose or another. In this respect, the conveyor units 20 and 25 can, either or both, be made operable in the same manner as the conveyor unit 10, as hereinbefore described. And, since the instant invention in the main is directed to the operations of the conveyor unit 10 and sheet-supporting carrier 30, further description is not believed to be entirely necessary.

THE SHEET-SUPPORTING CARRIER

As viewed in FIG. 1, a supporting carrier 30 is shown in mounted position on the rail or track 101 of the conveyor drive unit 10 with a sheet S supported thereon. The carrier, designated in its entirety by the numeral 30 in FIGS. 7 to 17, can be constructed either to travel on the track 101 or to travel on track 102 (see FIG. 3), the only difference in structure between the carriers being the particular side thereof on which certain members, about to be described, are located (see FIG. 3). The carrier 30 as in FIG. 1, therefore, will be understood to be adapted for mounting on the track 101.

Each sheet-supporting carrier 30 includes a main body portion, generally designated by the numeral 300, formed by an inverted channel member or U-shaped base 301 comprised of a web 302, integral legs 303 and 304 and a mounting panel 305 that is supported by pairs of links 306 from said panel and clips 307 secured to the undersurface of the web 302 (FIGS. 2 and 4). Ball-bearing casters or wheels 309, for supporting the carriers on their respective tracks, are mounted in transversely aligned pairs by means of axles 310 supported in brackets 311 on the upper surface of the web 302.

The panel 305 along its lower margin carries a plurality of regularly-spaced, sheet-clamping members, generally designated by the numeral 313, including stationary elements 314 and movable components 315. Since these component clamping members are located with reference to one side or the other of the panel 305, the sides thereof are herein designated, for convenience of reference, as side 316 (FIG. 7) and side 317 (FIG. 13). Thus, the stationary elements 314 are fixedly mounted by brackets 318 on side 316, as in FIGS. 7 and 9, and include a bar 319 having a facing, nonabrasive layer or pad 321, as of a cork material.

On the panel side 317, the movable components 315 are generally mounted by U-shaped brackets 323 having side walls 324 and a web or end wall 325. A lever 326 is received within each bracket 323 on a rod 327. The lever is adapted to move upwardly and downwardly along an inclined path defined by slots 328 in side walls 324. The lower end of the lever is formed with notches in which lugs of a bar 332 are swingably supported by a pin 333. As in the case of bar 319, the active face of bar 332 is provided with a layer or pad of cork material 334 to thereby positively grip the opposite surfaces of a sheet, such as a sheet of glass, without scratching or otherwise marring said surfaces. The swingable mounting of the bar 332 permits the layer 334 to come angularly into contact with the surface of the sheet and to then gently rock thereon into full engaging contact as downward movement of the lever 326 is completed.

The several levers 326 are moved in common and downwardly from their upper, open positions, as in FIG. 9, to lower, clamping positions as in FIG. 15. These motions are produced by an elongated slide-plate 336 that is slideably supported along its lower margin in recessed corners or notches 337 provided in the end walls 325 of brackets 323 (FIGS. 15 and 16). As seen in FIG. 16, the upper margin of the plate 336 is engaged by keeper blocks 338 to sustain it in a vertical plane while permitting relatively free endwise movement.

The slide-plate 336 is formed with slots 340 that are so inclined to the horizontal (FIG. 13) that the vertical distance between the upper and lower terminus of each slot will substantially equal the upward and downward limits of required travel of the related levers 326. For this purpose, each lever 326 is provided with an outwardly directed finger 341 associated with each slot 340 so that when the plate 336 is moved in the direction of the arrow, designated by the reference numeral 342 in FIG. 13, the fingers 341 will simultaneously move downwardly to lower the levers 326 into clamping position with reference to stationary bars 319.

In this connection, it will be understood that the lower ends of bars 326 move both downwardly and inwardly as the ends of support rods 327 traverse the slots 328 in the side walls 324 of the brackets 323 to move the bars 332 into clamping position with reference to stationary bars 319. The slide-plate 336 is first urged in the direction of arrow 342 during a loading or clamping operation, and eventually in the opposite direction during the subsequent unloading operation while the carrier is located in an area at which the sheet can be released.

When the levers 326 are located in their lower clamping positions, the upper ends 345 thereof are adapted to be engaged by resilient clamping devices generally designated by the numeral 346. As in FIG. 15, each of these devices includes a cup-shaped plug 347 that is telescopically supported on a cup-shaped plug 348 which in turn is slidably mounted by a bushing 349 in the body of panel 305. A spring 350 is contained within the cupped plugs 347 and 348 to resiliently urge the plug 347 outwardly from the related plug 348 and against the adjacent end 345 of the associated lever 326. Each cupped plug 348 is acted upon to produce the clamp-securing action by an individual annular cam 353 that is eccentrically mounted with reference to the axis of a shaft 354 and fixed thereon by setscrew 355.

WIth reference to FIG. 14, the shaft 354, which can be formed, although not necessarily, of axially aligned portions united by couplings 356, is supported on side 316 of the panel 305 by bearing blocks 357. One end of the shaft 354 is tapered as at 358 (FIGS. 7 and 17) and inwardly thereof is equipped with a component chuck member 359 having diametrically aligned notches 360 to provide bayonet-type jaws 361 (FIG. 17). When the carrier is in a loading area, the levers 326 are in the upper position and the cam rollers 353 are inactively positioned as in FIG. 9.

The shaft 354 is also equipped with a fixed lock-collar 364 having diametrically opposed sockets 365 in the peripheral surface thereof (FIG. 16). Rotation of the shaft, although produced and controlled by rotation of chuck member 359, is thus restricted to an arc of substantially 180° by a spring-actuated dog 366 supported in the end of a threaded plug 367 mounted in the panel 305 and adjustably secured by locknut 368.

Each carrier 30 is adapted to be propelled along the conveyor system by means of connector devices 369 and 370 having permanent magnet characteristics. As shown in FIGS. 7, 8 and 10 to 12, the carrier mounts the connector devices or bars 369 and 370 adjacent the respective ends thereof. For this purpose, each of these devices (FIG. 10) comprises a pair of plates 371 and 372 separated by a plurality of magnetic elements 373 having a protective layer 374 located along their upper and lower surfaces; the assembly being secured together by screws 375 and provided with mounting slots 376. Each connector device or magnetic bar 369 or 370 is carried on the leg 303 of the carrier frame 300 by a pair of brackets 377 secured by bolts 378. The brackets are formed with an outwardly directed boss or block 379 having a longitudinal, vertically open groove 380.

Preparatory to mounting a bracket 377 on the leg 303 of channel 301, a bar 369 or 370 is placed in the groove 380 and loosely held therein by a screw 383 passed through the slots 376 and threaded in the outer leg 384 of the block 379 (FIGS. 6 and 7). The connector bar is urged upwardly within groove 380 by a spring-loaded plug 385 received in a socket 386 in the floor 387 of the groove 380.

With reference to FIGS. 1 and 3, it will be seen that the upper edges of the bars 369 and 370 magnetically contact several of the plurality of the plates 174 of the chain belts 115–116 of the conveyor drive units and, as the belts are operated, the plugs 385 will urge the bars 369 and 370 upwardly against a plurality of such plates carried in the lower flight of each of the belts to thereby propel the carrier in the direction of belt movement. In the event that plates, such as plates 174, are as hereinabove described made of a permanently magnetized metal, the connector bars would alternatively be made up of solid or laminated metal plate.

Each carrier 30 is adapted to produce actuation of the several switch devices on the conveyor motor drive units; such as LS 176, LS 178 and LS 179 on the conveyor drive unit 10. Thus, as will be seen in FIGS. 3 and 4, the inwardly disposed leg 304 of each carrier channel member 301 is provided with an angle iron, switch-actuator element 390 which by its horizontally disposed leg 391 affords a switch actuating surface and with the leg being formed at its ends with downwardly inclined surfaces 392 and 393. In the case of the switch devices associated with the conveyor drive unit 10, and associated units 20 and 25, when these surfaces 392 and 393 are disposed between and thereby disengaged from adjacent switch devices, the carrier will be suitably located in a centered position on the conveyor unit.

MODE OF OPERATION

It has been hereinbefore noted that a conveyor system, as herein disclosed, comprises a plurality of conveyor motorized units arranged in substantially horizontal, aligned end-to-end relation to one another. Obviously, such conveyor system would include a conveyor unit in a sheet-loading area and a conveyor unit in a sheet-unloading area, both not here disclosed, between which are interposed several units of which the conveyor motorized unit 10 is typical. As seen in FIG. 3, each of these conveyor units is equipped with parallel rails or tracks 101 and 102 whereby sheet-supporting carriers 30, as are illustrated in FIG. 7 but reversely constructed as indicated in FIG. 3, are adapted to be supported. Each carrier has a pair of connector bars 369 and 370 that are adapted to magnetically attract and thereby become engaged with plates 174 carried by lugs 173 on the links 172 of the chain belts 115 and 116 that are driven by motors 125 and 126 associated with the conveyor unit 10.

While a carrier 30 is located in the loading area, a sheet S is positioned such that one marginal surface of its upper edge will be in contact with the facing layers 321 of the bars 319 associated with the several fixed elements 314 (FIGS. 7 and 9). Now, by means not forming a part of the instant invention, the slide-plate 336 is caused to move in the direction of the arrow 342 of FIG. 13 with resulting downward and inward movement of the several levers 326 and contact of the layers 334, on the bars 332 at the lower ends of the levers, with the opposite surface of the sheet (FIG. 15). The shaft 354 is next rotated, when the chuck member 359 is engaged, to turn the cams 353 and thereby cause the plugs 348 to compress the springs 350. This action urges each of the related cup-shaped plugs 347 against the upper ends 345 of the levers 326 which serves to firmly clamp the upper edge of the sheet as in FIG. 15.

Upon operation of the motors of the several conveyor units, the carrier 30 supporting a sheet S will be advanced in continuous intermittently occurring sequences of movement along the conveyor system and with one carrier moving from the unit 20 onto the unit 10 after a leading carrier has been advanced from said unit 10 onto the next conveyor unit 25. When the leading connector bar 369 is disengaged from the plates of chain belt 202, the trailing connector 370, being still attracted and engaged with the plates of said belt 202, serves to continue advancing movement of the carrier. The lead bar 369 engages the plates 174, carried by the chain belt 115, and moves the carrier along the track 101 after the trailing bar 370 is disengaged from the chain belt 202. As herein described, the bars 369 and 370 of a carrier entering onto the track 102 of the conveyor unit will engage the plates 174 carried by the chain belt 116 as is believed apparent in FIG. 3.

When the leading end 392 of the switch-actuator element 390 trips LS 178, it will stop operation of the motor 125 to halt movement of the related carrier. In the event the end 392 is carried into engagement with LS 179, operation of the motor 125 will be reversed to move the carrier rearwardly with a "jogging" motion. This is also true with regard to LS 176 which, if tripped by the trailing end 393, will produce forward jogging movement of the carrier until it arrives at a "centered" position on the track 101 of the conveyor unit. Positioning of a carrier on the track 102 is effected in the same manner.

Upon completion of any treating operations on the sheet or sheets, the carrier or carriers are advanced into an unloading area. When the carrier has been brought to a stationary position, the shaft 354 is reversely turned and the slide-plate 336 retracted to relieve the clamping action along the upper edge of the sheet and permit the same to be removed from the carrier.

I claim:

1. Apparatus for conveying sheets of material comprising:
   a. a carrier;
   b. means supporting said carrier for movement along a generally horizontal path;
   c. a plurality of chain belts located along the path of movement of the carrier and spaced from one another along said path;
   d. means for driving said chain belts; and
   e. magnetic means acting to couple said carrier to the chain belts to move said carrier along said path including at least two spaced magnetically attractable members carried by said carrier, the distance between adjacent chain belts being less than the distance between said two members.

2. Apparatus for conveying sheets of material as defined in claim 1, wherein said chain belts are comprised of links having a magnet attached thereto.

3. Apparatus for conveying sheets of material comprising:
   a. a carrier;
   b. means supporting said carrier for movement along a generally horizontal path;
   c. a plurality of chain belts located along the path of movement of the carrier and spaced from one another along said path;
   d. means for driving said chain belts; and
   e. magnetic means acting to couple said carrier to the chain belts to move said carrier along said path including at least two spaced magnets carried by said carrier, the distance between adjacent chain belts being less than the distance between said two magnets.

4. Apparatus for conveying sheets of material as defined in claim 3, wherein each chain belt is comprised of links formed with a lug portion on which is fixed a magnetically attractable plate.

* * * * *